United States Patent
Gold et al.

(10) Patent No.: US 6,776,343 B1
(45) Date of Patent: Aug. 17, 2004

(54) INTELLIGENT MEDIA READER AND LABEL PRINTER

(75) Inventors: Stephen Gold, Bristol (GB); Ian Peter Crighton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/937,021

(22) PCT Filed: Feb. 25, 2000

(86) PCT No.: PCT/GB00/00676
§ 371 (c)(1),
(2), (4) Date: Sep. 20, 2001

(87) PCT Pub. No.: WO00/57353
PCT Pub. Date: Sep. 28, 2000

(30) Foreign Application Priority Data

Mar. 24, 1999 (EP) ............................................ 99302266

(51) Int. Cl.[7] .................................................. G06K 7/10
(52) U.S. Cl. ............................ 235/472.01; 235/462.45
(58) Field of Search ............................ 235/472.01, 385,
235/383, 462.13, 462.45, 462.46, 472.02

(56) References Cited

U.S. PATENT DOCUMENTS

| | | | |
|---|---|---|---|
| 4,141,045 A | 2/1979 | Sheehan | |
| 5,121,687 A | 6/1992 | Arcotta | 101/43 |
| 5,455,409 A | 10/1995 | Smith et al. | |
| 5,503,483 A * | 4/1996 | Petteruti et al. | 400/88 |
| 5,568,455 A | 10/1996 | Balsom | 369/30 |
| 5,581,522 A | 12/1996 | Sibuya et al. | 369/36 |
| 5,592,596 A | 1/1997 | Balsom | |
| 5,640,002 A * | 6/1997 | Ruppert et al. | 235/472.01 |
| 5,679,943 A * | 10/1997 | Schultz et al. | 235/472.02 |
| 5,765,954 A | 6/1998 | Nunokawa et al. | |
| 6,027,019 A | 2/2000 | Kou | 235/375 |
| 6,138,909 A | 10/2000 | Rockwell et al. | 235/383 |
| 6,311,896 B1 * | 11/2001 | Mulla et al. | 235/472.03 |
| 6,505,981 B1 * | 1/2003 | Takami et al. | 400/602 |

* cited by examiner

Primary Examiner—Daniel St.Cyr
(74) Attorney, Agent, or Firm—Lowe Hauptman Gilman & Berner, LLP (57) ABSTRACT

A hand-held portable reader and labeling device for interrogating data storage cartridges of the type containing an in-built memory chip having information stored describing details of data contained on the data storage medium is disclosed. The reader-labeling device comprises a processor, random access memory, printer, display, keypad, operating system, transponder, receiver and battery power supply. By scrolling a menu display, key parameters describing a data cartridge can be accessed quickly and efficiently without the need to access the data storage medium itself. A cartridge media specific label may be rapidly printed for attachment to a data storage cartridge.

24 Claims, 7 Drawing Sheets

Serial No: 2851035268     1st file: C:/Records.Backup.0108B1

Date Last Used:   05 Sep 97     Last file: C:/Records.Backup.0408B1

Space Remaining: 445MB

Fig. 6

INTELLIGENT MEDIA READER AND LABEL PRINTER

FIELD OF THE INVENTION

The present invention relates to a hand holdable portable reader device.

BACKGROUND TO THE INVENTION

In order to store digital electronic data, such as back-up data from a server computer device, it is known to use magnetic tape data storage cartridges comprising one or a pair of rotatable reels, and an elongate band of magnetic tape. A main reason for using such tape data storage cartridges is to make back up copies of important data. Customers running large computer installations, or research and development facilities having significant amounts of data generated may have hundreds or thousands of tape data storage cartridges containing back up data, backed up from a wide range of different host devices such as servers and computer devices. Large collections of tape data storage cartridges tend to be stored in centralised library locations, sometimes situated in fire proof safes or fire proof rooms. The library storage facility may be geographically remote from the host server devices, so that if there is destruction of data on the host devices, for example by a fire, the back up data remains safe. When a host device fails and data is lost, it is necessary to quickly locate the tape cartridge having the latest back up data, which may be located in an offsite library.

These libraries include manual access libraries, where the cartridges are simply stored on shelves or in racks or boxes, with access to the cartridges being by manually picking up the cartridges, or automated libraries, where the cartridges are stored in predefined locations on a rack or shelf and are automatically accessed. In a manual access library, to identify a content of a tape cartridge a person may simply write out a label manually, describing the content of the data on the tape cartridge. This process is tedious and prone to error. For example the wrong label might be put on the wrong tape, so that the contents of the label do not coincide with the data of the tape cartridge. Alternatively, tape cartridges have barcodes printed on their external cases, so conventionally finding a particular tape may involve using a barcode scanner to scan a plurality of barcode labels on a plurality of tape cartridges. In the case of an automated library, robotic arms which are software controlled, deposit and collect cartridges in a rack, or shelf, and use a serial number of a tape data storage cartridge to determine a location within the library shelf or rack on which to store the cartridge. The rack or shelf is accessible by the robotic arm which may physically select a required tape on receipt of user instructions, the robotic arm being moved under computer control to a cartridge storage location on the rack or shelf.

Conventionally, a person wishing to find an item of stored data on a cartridge will need firstly to identify the correct cartridge with the data on it, and secondly identify a position of the data on the tape stored within the cartridge. In the case of single reel cartridges, the whole of the magnetic tape is wound on to the single cartridge whenever the cartridge is not in a tape drive mechanism. To find a particular item of data on a cartridge, a person must select the cartridge, put the cartridge into a conventional tape drive device, for example forming part of a host personal computer, workstation, or computerised test equipment device, and view a content of the tape on a visual display unit forming part of the host computer, workstation or test equipment device. There is a time lag incurred in winding and rewinding the tape to identify a particular item of data.

A current industry trend in tape data storage media is to supply a solid state transponder memory data storage device on or within a tape cartridge, on which can be stored information describing a data content of the tape. Examples of the type of information stored include file name and type, customer information system data backed-up, application and file space on the magnetic tape used or remaining. The information stored on such a memory device is upgraded when the magnetic tape is accessed using a known tape drive in a host computer having an integrated driver and read-write device, controlled by software resident on the host device. Many different types of tape data storage cartridge are used in system backup and the location of the transponder memory storage device in relation to a casing of the tape cartridge varies between cartridge media types and is specific to the particular cartridge media type in each case.

To identify items of data stored on the tape cartridge, the memory device comprising part of the cartridge stores data as mentioned above, describing the file names, customer information, application and file space remaining on the tape or used on the tape, and dates of storage of files. A summary information describing the data items stored on the tape can be obtained by automatically interrogating the transponder memory storage device in the cartridge, which is read by the tape drive device by inductive coupling to a transceiver chip forming part of the memory device, and which can be displayed on the visual display unit of the host device. Reading the content of the memory device involves physically picking up the data cartridge, putting the data cartridge in the tape drive of the host device, operating a keypad or pointing device, for example a mouse or tracker ball, to select menu items from an application program on the host device, in order to identify the information describing the data content of the tape.

In order to print a label for the tape, this involves running an application stored on the host device, perhaps manually entering the information describing the data on the tape via a keyboard and/or pointing device and then printing out the label. A problem in printing a label for the tape cartridge by this mechanism is the time taken to print each label. For example, for a person wishing to find a particular item of data in a library, the first time a person enters the library on a particular day, he may have to pick an unlabeled tape cartridge which the person thinks the data item may reside on, and in order to check the data on the cartridge needs to turn on the host computer device, wait for the host device to boot up and initialise, taking possibly a minute or two, select the application required for reading the memory device on the cartridge, again perhaps taking of the order of one or two minutes, and then read the data. If the data cartridge does not contain the required data, then the person needs to remove the cartridge from the drive, which may or may not involve a delay in the software controlling the tape drive unit allowing the person to remove the tape, and then select a different tape from the shelf. For the second, subsequent tape cartridge inspected, the time delays will be shorter than inspecting the first data cartridge, since the host device does not need to be booted up and initialised. However, there is still a significant delay in interrogating the memory device on the cartridge through the application software provided by the host device.

Having found the data cartridge containing the required data, in order to print a label for attachment to the cartridge, the person needs to call up the application software for printing the label, perhaps enter details describing the cartridge manually into the printing application software, using a keyboard and/or pointing device and before printing make sure that an attached printer device is turned on. In order to turn the printing device on, the printing device may go through a print initialisation routine, which in the case of an inkjet printer may take several minutes if used for the first time on a particular day, and providing there is sufficient print medium in the printer device, then a label can be printed. However, since many printer devices use paper as a print medium, it may be necessary to find and insert sheets of adhesive labels into the printer in order to print out an adhesive label for the tape cartridge.

Therefore, conventionally it may take anything of the order of 10 to 16 minutes to print a label for a data cartridge, including all the time delays involved in booting up a host device and initialising a printer. Additionally, this assumes that a host computer device is available at the location of the library, which it may not be, in which case an additional delay is incurred in taking the tapes to the host device for the data to be reloaded. Although the time delay taken to print a label for subsequent tape cartridges after the first will reduce per cartridge, the cataloguing and identification of data stored on existing legacy libraries of tape data storage cartridges is a time consuming process, whether the library is a manual access library, or an automated library having a robotic device for selected cartridges.

In all cases, in order to improve ease and accuracy of access to the required data, a system for checking the data stored on a tape and labeling the tape accurately will be of benefit.

SUMMARY OF THE INVENTION

Specific methods according to the present invention, recognise that information contained on transponder memory devices in a data storage cartridge can be used to provide a rapid means of access to a data set which can be utilised to identify the cartridge and to produce a cartridge label.

Conceptually, the specific embodiments of the invention aim to provide an integrated printer with built-in radio frequency capability to read information stored on a memory device integrated into a data storage medium cartridge casing which automatically prints the information read from the memory device in a pre-formatted user-readable form on a label suited to the specific cartridge casing type.

According to first aspect of the present invention there is provided a hand holdable portable reader device capable of reading data stored in a memory device attached to a cartridge-type data storage device said reader device comprising:

a signal receiver means capable of receiving data signals emitted from said data storage device;

a memory means capable of storing said data signals received by said receiver means;

a printer device configured to print at least some of said data received from said receiver means onto a print media; and a processor device operable to control said printer to print said data on said print media.

Preferably said printer is configured for printing a label of a size and shape suitable for direct attachment to a said data storage cartridge.

Preferably said processor is configured to select a predetermined selection of information items describing said data storage device from said data received from said data storage device, and to control said printer to print said predetermined set of information items onto a said print media in a predetermined format.

The device may further comprise a keypad control means, said keypad control means being finger operable for inputting user commands to said processor, for controlling said display device for scanning through data items describing said data storage device, said data items retrieved from said memory means.

The device may further comprise a keypad control means configured for operating such that upon a user activating a key of said keypad control means, said printer device operates to print a predetermined selection of data items describing said data storage device, on to said print media.

Preferably said processor device is operable under control of a dedicated operating system stored in a read only memory device.

The reader device may further comprise an interface means for interfacing with an external processor.

The reader device may further comprise a display means, and said processor operates under control of said operating system and a keypad data entry means to display a selection of user selectable menu items on said display means.

The reader device may have a keypad device comprising a print key wherein said processor operates to receive a print signal produced by activation of said print key, and sends a print signal to said printer for printing data items input via said receiver.

Preferably said reader device comprises a port adapted to locate said data storage device and said receiver means is located within said port such that when a said data storage device is inserted into said port a memory device of said data storage device lies in close physical proximity to said receiver means.

The reader device may further comprise a housing for accepting a roll of blank labels.

Preferably, the reader device comprises a port adapted to locate said data storage device, said port comprising a recess specifically shaped and formed to accept said tape data storage device.

Said reader device may comprise a port adapted to locate said data storage device, said port comprising a surface against which said data storage device may be offered in close proximity to said surface, such that a receiver device may detect signals transmitted by said data storage device.

The invention includes a hand-holdable portable reader device for reading data from a memory device contained on a data storage device, said reader device comprising:

a casing having a port capable of accepting a said data storage device;

reading means for reading data from said memory device of said data storage device, said reading means located in said port;

processor means configured for controlling said reading means and for accepting data signals received by said reading means;

memory means containing an operating system for controlling said processor means by a sequence of command signals;

display means for displaying said data obtained from said receiving means in a user readable format;

keypad data entry means capable of receiving input commands for activation of said menu items; and printer means operable under control of said processor means for printing a label in response to a user command signal input activated by said keypad data entry means, wherein said label contains at least some of the data read from the memory device of the data storage device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practised without limitation to these specific details. In other instances, well known methods and structures have not been described in detail so as not to unnecessarily obscure the present invention.

In order to remove errors in cartridge labeling and to improve the speed of labeling, a media-dependent labeling system is envisaged which is specific to a particular type or design of data storage media device. This uses information contained on a memory device located in the data storage cartridge (the media) to produce a printed cartridge label, where the label attributes can be selected by the user. This system enables cartridge data to be assessed and the cartridge to be labelled without having to access the data stored on the magnetic tape and hence avoiding the use of a tape driver of a host device. As a result, the information concerning data contained in the cartridge can be assessed rapidly. By integrating a means of reading the information contained on the cartridge memory device with a means of printing this information either directly to a pre-labelled cartridge or to a blank label all within one device, cartridge labels may be updated accurately and rapidly.

Labeling of a data storage device need not occur at a time when data is recorded on the data storage medium, but labeling can occur retrospectively, and away from a host device having a tape drive mechanism.

Additionally, the device may support multiple language sets and fonts for versatility in user readout. This will allow for versatility and accuracy in user access to cartridge data.

Specific methods described herein are concerned with the reading of data from solid state memory devices located on data storage devices and writing this data to a memory area and the selection of data from this memory area for display and printing. A media reader and printer device may be used as an independent hand held and portable device.

Figure 1:
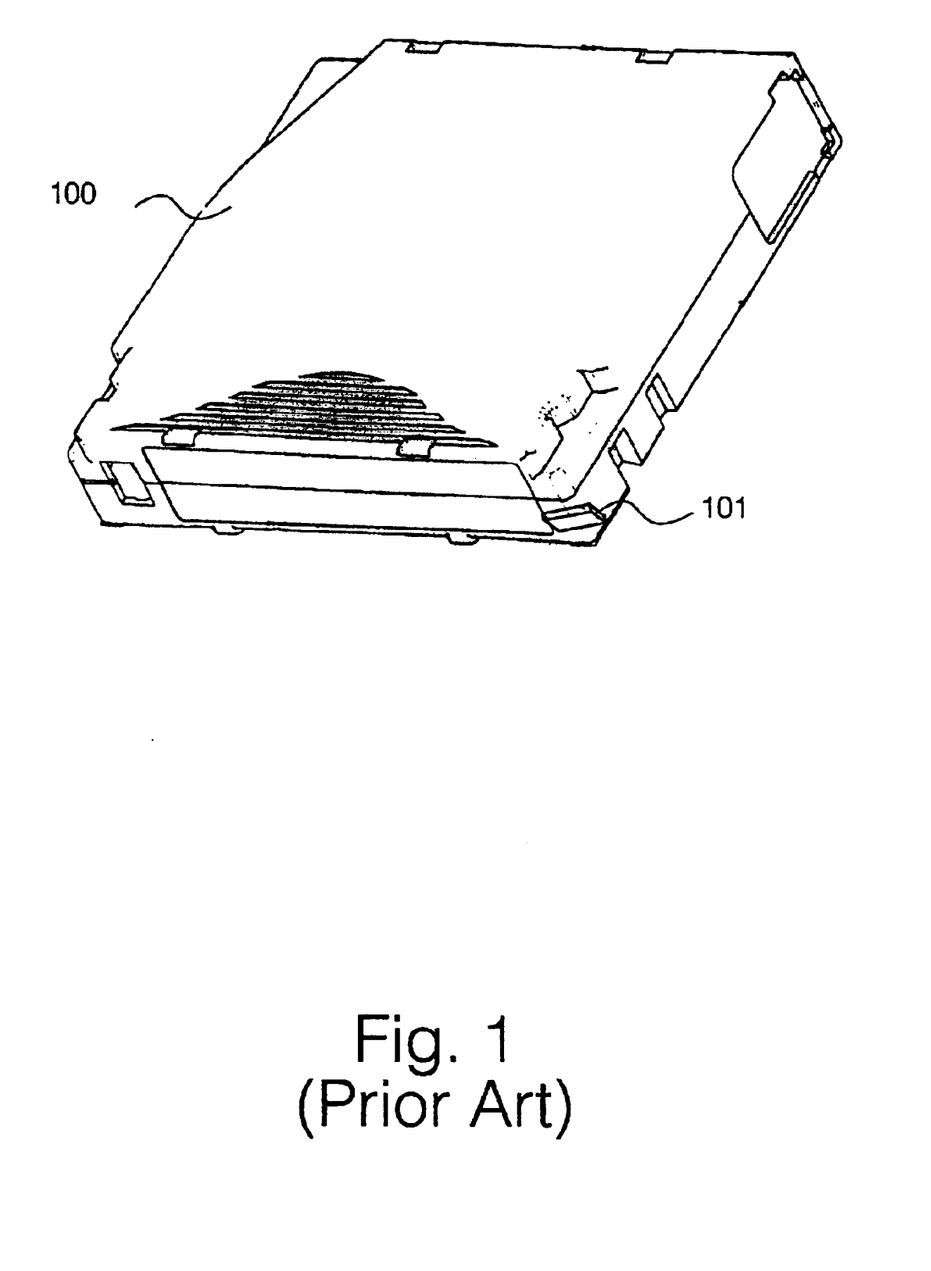
FIG. 1 illustrates schematically a tape data storage cartridge having an embedded read/write memory accessible by means of a transponder unit within the cartridge, as is known in the prior art.

Referring to FIG. 1 herein, there is illustrated schematically a conventional prior art tape data storage cartridge device comprising a cartridge casing 100, containing one or a pair of reels on which is wound an elongate band of magnetic tape, comprising a high capacity data storage medium on which data may be recorded from a host device such as a computer server device, a personal computer, a workstation, or a computer controlled test instrument. The cartridge contains a solid state programmable memory device 101 within the cartridge casing 100, the memory device comprising a transponder unit, and a read/write memory, which can be written to or read via the transponder unit, which can be inductively powered by an RF signal generated by a transmitter placed immediately adjacent the cartridge casing, as is known in the art. The height, width, and length dimensions of the cartridge casing 100 and the general layout of the casing, including the positioning of the memory device 101 within the casing, are specific to the particular type and design of tape data storage cartridge. That is to say the layout of the cartridge is media specific.

Information about the cartridge and the data stored on the cartridge can be stored in the memory device 101. The data stored may include data describing file names of data on the tape, data describing customer information, data describing an application stored on the tape, data describing an amount of unused memory space remaining on the tape, and dates upon which files were stored.

Figure 2:
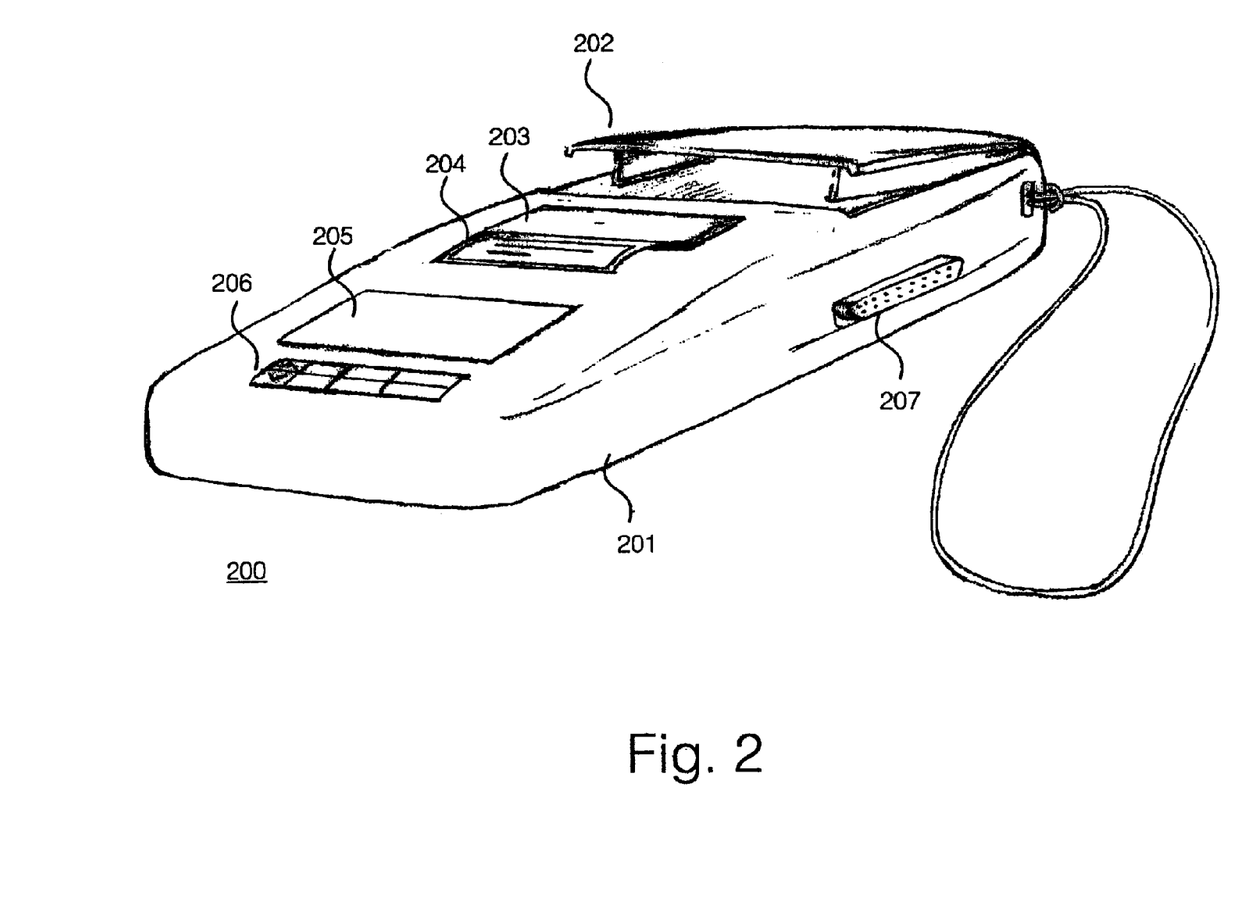
FIG. 2 illustrates schematically a first data storage media reader and printer device according to a first specific embodiment of the present invention, comprising a casing, a port to insert a data storage cartridge for accessing information contained on a memory device on the cartridge, a display screen, a printer and keypad allowing data to be selected by a user.

Referring to FIG. 2 herein there is illustrated a first media reader and labeling device 200, according to a first specific embodiment of the present invention. The first reader and labeling device comprises a casing 201 of a size, shape and weight which is easily portable by a person, for example of a size and shape which can easily fit into a persons palm, being hand-held, the casing having means 202 for receiving a tape data storage cartridge in the form of a port arranged to locate a cartridge; an electrically powered printer device 203 capable of producing printed labels from a roll of self-adhesive labels 204; a display device, preferably a liquid crystal display 205; a user input interface 206 having a finger operable keypad; a battery power supply; a receiver device for communicating with a memory storage device on a tape data storage cartridge, the receiver device being located in or near the cartridge port; and an external port 207 for connecting to an external computer device or processor.

The port for receiving the tape data storage cartridge may comprise a hinged lid having a pair of receiving guides into which the tape data storage cartridge is slotted, such that when the lid is closed the cartridge is positioned within the casing such that the memory storage device of the cartridge is immediately adjacent the receiver device mounted in the casing, the arrangement being that the receiver device of the reader device is in close physical proximity with the transponder memory storage device of the tape cartridge such that inductive coupling can occur between the receiver and memory storage device, allowing reading of data from the memory storage device by the receiver.

The cartridge receiving port 202 is designed to accept a particular type of data storage cartridge, and may be specific to a particular type of data cartridge product. Port 202 is designed such that when the tape data cartridge is accepted into the port, the memory storage device on the tape data cartridge aligns automatically with an aerial and receiver of the reader device within casing 201.

The means for receiving the cartridge preferably operates to secure and hold the cartridge in a position such that the memory storage device on the cartridge is immediately adjacent and opposite the receiver of the reader and labeling device. The port 202 is preferably keyed such that the tape data storage cartridge can only be inserted in one orientation, and to avoid enabling other types of tape data storage cartridge being inserted into the port.

In a variation of the first embodiment, the port means capable of receiving the tape data storage cartridge may comprise a recess specifically shaped and formed to accept the tape data storage cartridge, or a spring loaded slot mechanism into which the tape data storage cartridge is inserted.

In a second embodiment, the port may comprise a surface, against which a data storage cartridge is offered, in close proximity to the surface, but not necessarily contacting the surface, such that the receiver device can detect signals transmitted by the transponder within the cartridge across an air-gap of the order of 20 mm or less between receiver and transponder. In this version, it is not necessary that the tape date storage cartridge touches any part of the reader and labeling device in order for data transfer to occur.

Printer 203 contains an easily removable cover portion which accesses a housing for containing the roll of labels. The housing and its cover are designed such that the cover can be easily and quickly removed manually without the need for special tools, and expired roll of labels be easily removed, and a new roll of labels be easily inserted, whereby the roll of labels are automatically aligned with a print-head of the printer on entering the roll of labels into the label housing. Printer device 203 prints out a label 204 of dimension and shape which is specific to the particular data cartridge type and which is large enough to print out predetermined information concerning the tape data cartridge in a layout and form which fits on the label which can be easily adhered to the tape data cartridge.

Keypad 206 comprises an up scroll finger-operable button for scrolling a selection of memory items displayed on display device 205 in an upward is direction; a down scroll button for scrolling the memory items in a downward direction; and a print button.

Figure 3:
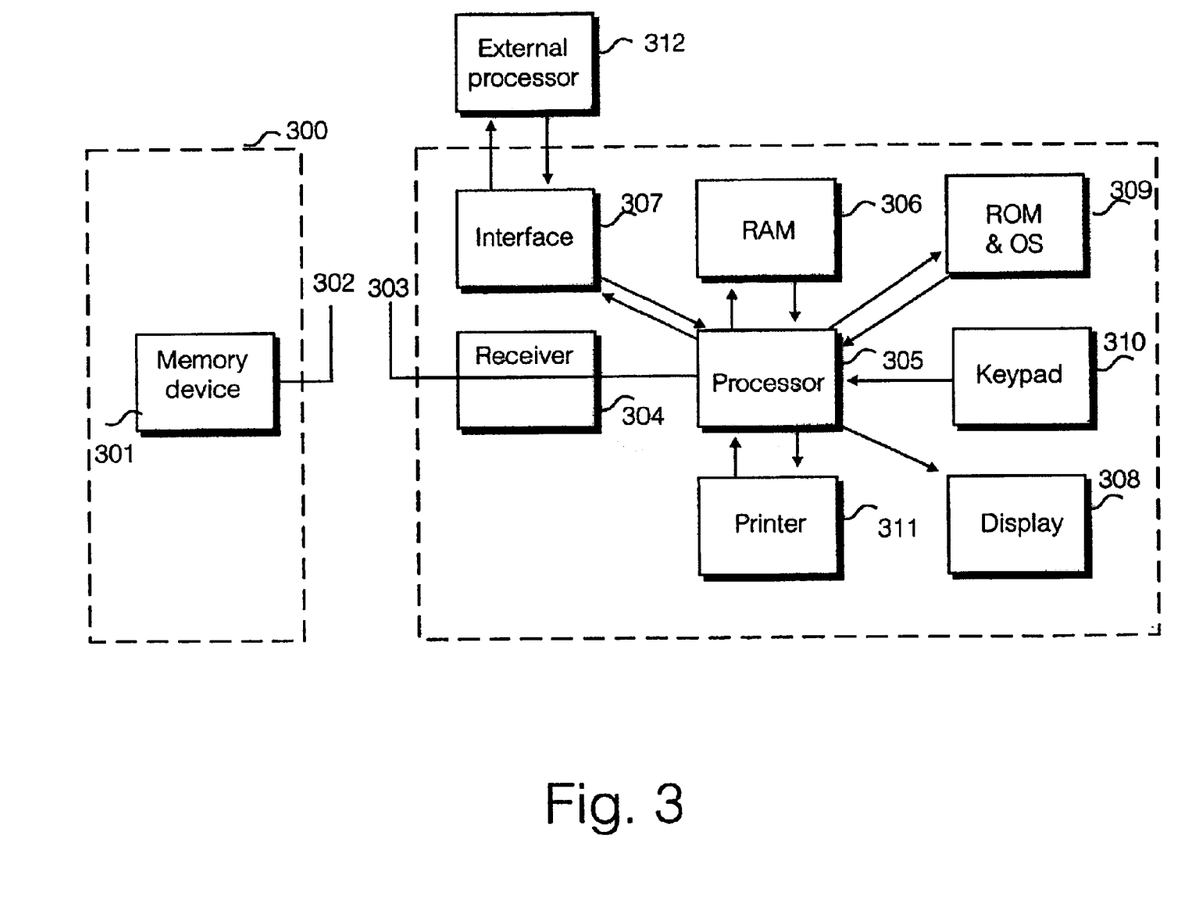
FIG. 3 illustrates schematically internal electronic components of the data storage media reader and printer device of FIG. 2, illustrating interaction with a transponder device on a tape data storage cartridge.

Referring to FIG. 3 herein, there is further illustrated schematically components of the first reader and labeling device, configured for reading, displaying and printing data onto a label from a transponder 300 having a read/write memory 301 and an aerial 302 in a tape data storage cartridge.

The reading and labeling device comprises an aerial 303, a receiver 304, a processor 305, a programmable memory area 306, a control interface 307, a display 308, a Read Only Memory (ROM) .309 containing an operating system, a keypad 310 for entering instructions from a user, and a printer device 311. Interface 307 is capable of unloading to or down from an external device 312 having a processor.

The processor 305 has a relatively small amount of separate memory 306 of the order of 1 MByte or less, and is limited practically by the smallest size of memory chip commercially available. Alternatively, the processor 305 may be constructed integrally with memory area 306 on a same chip, for example a known Power PC® chip. In the best mode, to achieve compact size and ease of manufacture, the components are as integrated as possible with the processor, and preferably include a built-in operating system in read only memory ROM 309, on a same chip as processor 305.

The aerial 303 and receiver 304 are used to receive data from the memory device 300 of the cartridge, which uses an electrically erasable programmable read only memory (EEPROM) as read/write memory area 301. With the data storage cartridge inserted in the reader device, the aerial 302, of the memory device, forms a contact less interface with the aerial 303 of the reader device using an inductive coupling scheme using a magnetic field to transmit data to the receiver 304. In the best mode, the protocol used to transmit information by the inductive coupling scheme is known as the MIFARE® system developed by Phillips/Mikron of the type presently employed in "Smart" credit card technology for use in personal banking applications and which is known in the art. Advantages and features of this system as used by the first embodiment include a high reliability; operating frequency 13.56 MHz; and an anti-collision protocol, which provides an ability to handle several transponders in close proximity without interference.

Aerial 303 of the identification and labeling device is positioned such that when a tape cartridge having a cartridge aerial 302 is positioned in the cartridge receiving means 202 of the reader device, the two aerials are positioned a distance less than or equal to 20 mm from each other, so that inductive coupling can occur between the two aerials. Over such a range this yields coupling factors between aerials of the order 1 to 10% and transmission speeds of the order 100 Kbps between the aerials. Receiver 305 of the identification and labeling device transmits an inductive signal which is received by the transponder 301 of the tape cartridge, and which powers the transponder memory storage device in the tape cartridge, such that the transponder is able to emit signals describing the content of the memory storage area 301 across an air gap between the two aerials, which is received by receiver 303. Alternatively, transmission of data signals between the memory device and the reader-labeling device may be within the infra-red range of frequencies.

Data read from the memory device 300 in this manner is written via the processor 305 to programmable random access memory, RAM 306, where a copy of all read data is maintained. Data stored in the RAM 306 is displayed on the display screen 308 or is accessed via external processor 312 using the control interface 307.

Figure 4:
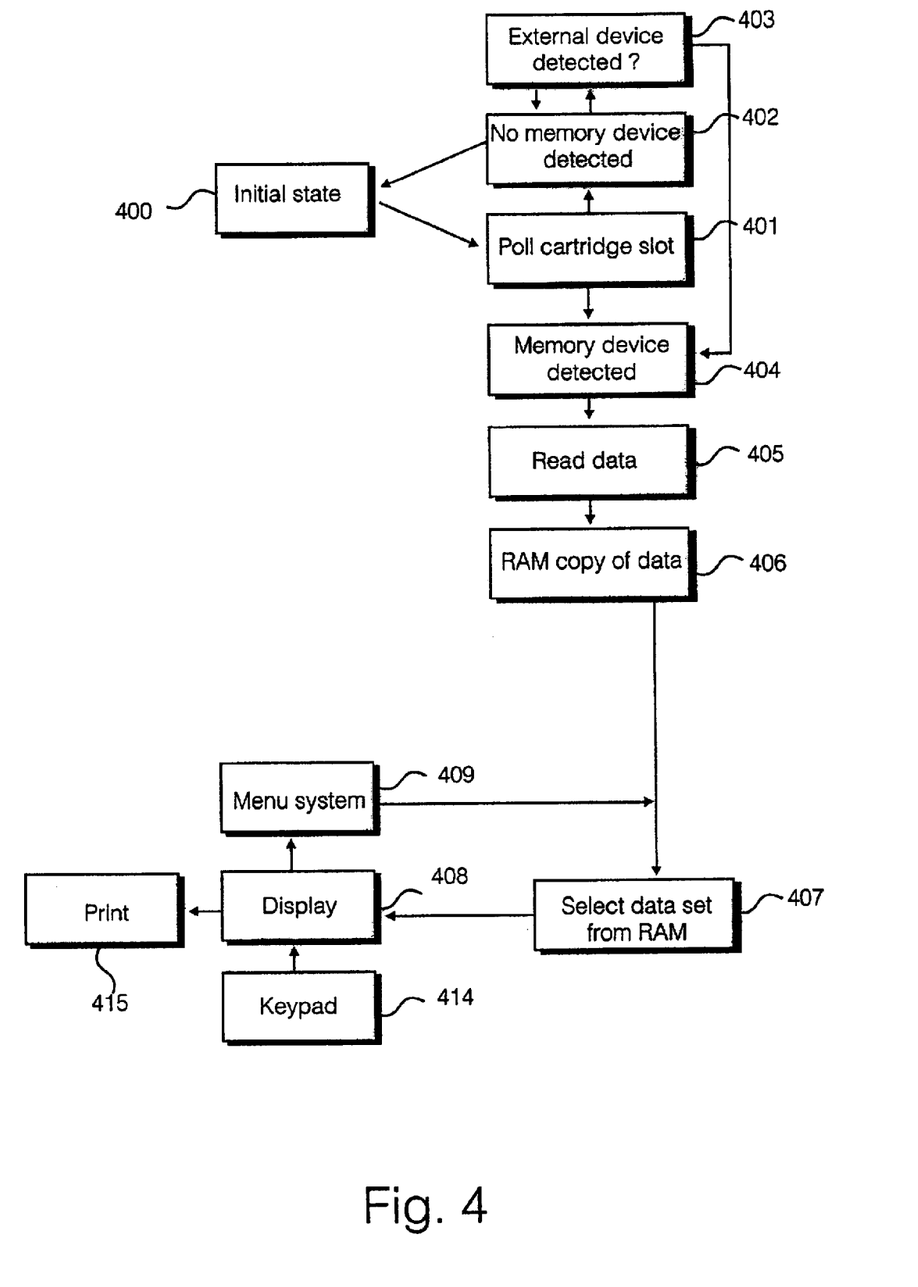
FIG. 4 illustrates schematically a command sequence for reading data from a memory device on a tape data storage cartridge, writing it to a memory area of the reader-printer device, and displaying and printing all or a selected set of the data.

Referring to FIG. 4 herein, there is illustrated schematically a process for operating the reader and labeling device implemented as a set of command sequences performed by the processor 305 to write data received from the cartridge transponder to internal memory 306, and to display the data on the display device 308. The command sequences provide for selecting a required data set and printing a label.

The first reader and labeling device may operate in two basic modes of operation. In the first mode of operation, a tape data storage cartridge is input into port 202, and LCD display device 205 and keypad 206 are used to read information stored on the memory storage device describing a content, and characteristics of the tape cartridge itself, and of data stored on the tape cartridge.

In a second mode of operation, a predetermined set of data stored on the memory of the tape data storage cartridge is printed onto a label 204. The first and second modes of operation may be operated independently of each other. That is to say, it is possible to read the information stored on the memory device on the cartridge without printing out any of that information, and it is possible to print the predetermined set of information on a label without requiring use of the LCD display device 205 or scrolled menu which appears on the device.

A first mode of operation will now be described. A user places a tape data cartridge into the receiving port 202 of the first reader and labeling device, thereby locating the cartridge firmly in the casing 201 of the device in a position where the transponder memory device 300 of the cartridge lies in close physical proximity to aerial 303 and receiver 304 of the reader and labeling device. Processor 305 under control of operating system stored in ROM 309 operates in an initial state 400, from which the cartridge port is periodically polled in step 401. All transponders 300 within the operating range return a 10 byte alphanumeric serial number. If no memory device is detected in the port in step 402, the cartridge port is presumed empty, and the processor idles through the initial state, and continues to poll the cartridge port in step 401. The cartridge slot is presumed empty if no serial number is returned. Consequently an external detector device incorporated in the cartridge port of the reader device may be polled in step 403 to check whether a cartridge is inserted into the port 202. If no cartridge is detected, the processor returns to initial state 400, continuously polling the cartridge slot in step 401 and/or polling the detector in step 403. If a memory device is detected in steps 403 or 401, the processor enters a memory device detected state 404 from which the processor reads data received by receiver 304 via aerial 303. Receiver 304 continuously transmits a power signal to the transponder 300 in the tape cartridge in order to allow the transponder to transmit signals through aerial 302 containing data concerning the information stored on the read/write memory device 301. Transmission of the power signal across the air gap by aerial 303 may be dependent upon the sensor within the reader and labeling device casing being activated by insertion of a tape data storage cartridge. When no cartridge is inserted into the port, the RF power signal may be interrupted, so as to conserve power in the battery.

Figure 5A:
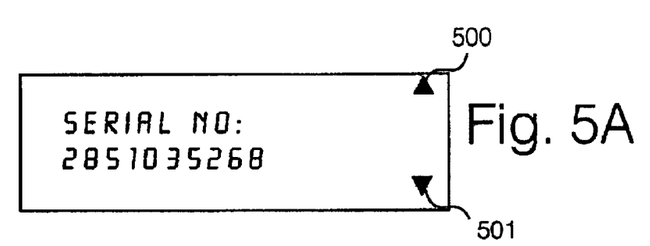
FIGS. 5A to 5G illustrates schematically displays of predetermined selected data items read from the data storage cartridge, and which appear on the display screen of the first reader-printer device.
Figure 5B:
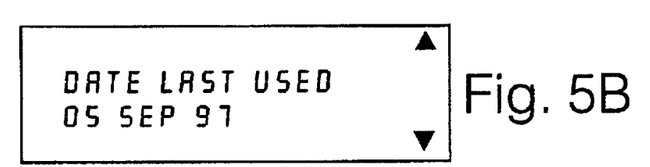
Figure 5C:
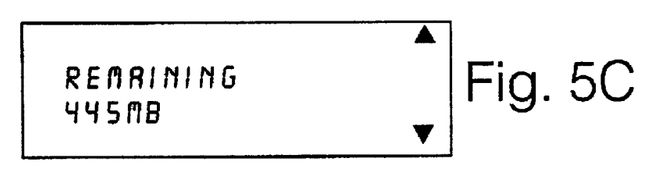
Figure 5D:
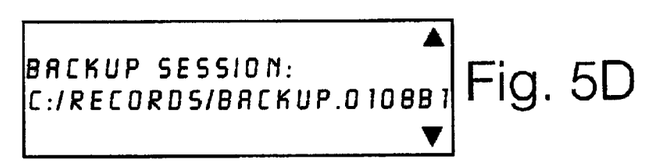
Figure 5E:
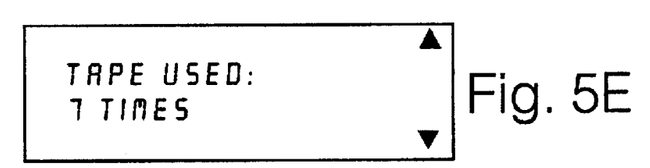
Figure 5F:
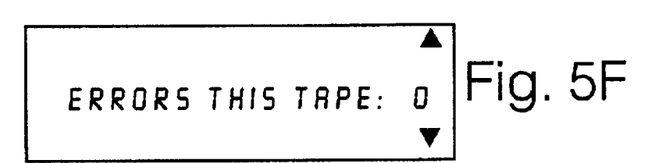
Figure 5G:
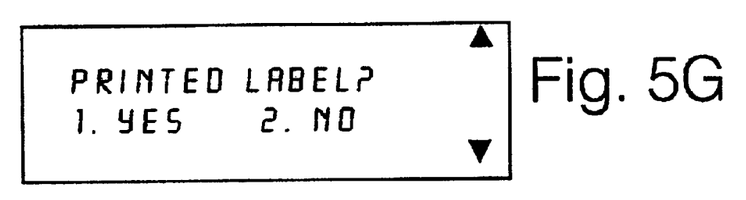

In step 406, data read from the memory device through receiver 304 is directed by the processor 305 into random access memory 306. Data can be selected from the random access memory in step 407 for display on display device 308 in step 408. Display of data from the RAM is accessed through operation of a menu system in step 409. Initially, predetermined data, for example a serial number of the cartridge which has been read from the memory device may be displayed on the display device 308. Referring to FIG. 5A herein, there is illustrated schematically an example of information displayed on display device 205, comprising a serial number of a tape cartridge. Upper and lower scroll icons 500, 501 may appear on display 205, giving a visual indication to the operator that to access further items of data, the upper and lower scroll buttons of the keypad 206 need to be activated. In step 410 a user may enter keypad entries, for example pressing a scroll button which scrolls through display items as illustrated in FIGS. 5B to 5G herein under control of the operating system stored in ROM 309, in menu system 409. The operating system stored in ROM 309 is specifically configured from a knowledge of the format and layout of the information items stored as data in the memory device of the cartridge. By scrolling through the menu, by operating the keypad scroll buttons, display of the serial number of the tape, the date the tape was last used, an amount of memory remaining on the tape, names of back up sessions stored on the tape e.g. "Full Backup Monday Mar. 8, 1998", a number of times the tape has been used, a number of errors on the tape and an option to print a label containing a predetermined set of information items describing data stored on the tape may be accessed. If, in response to a 'print label' display as illustrated in FIG. 5G, a key on keypad 206 is pressed, then in step 409, processor 305 sends a signal to printer 311, along with signals describing the information to be printed on the label, which activates printer 311 to print a label 204 in a format suitable for direct attachment to the tape data cartridge. The user may then release the port cover and remove the cartridge, detach the label 204 from its backing paper and stick the label on the cartridge. The label characteristics may be determined by user input via the menu system 409. Characteristics include a chosen language set, font size and type, and in this way allow the user to customise the label as necessary.

Figure 6:
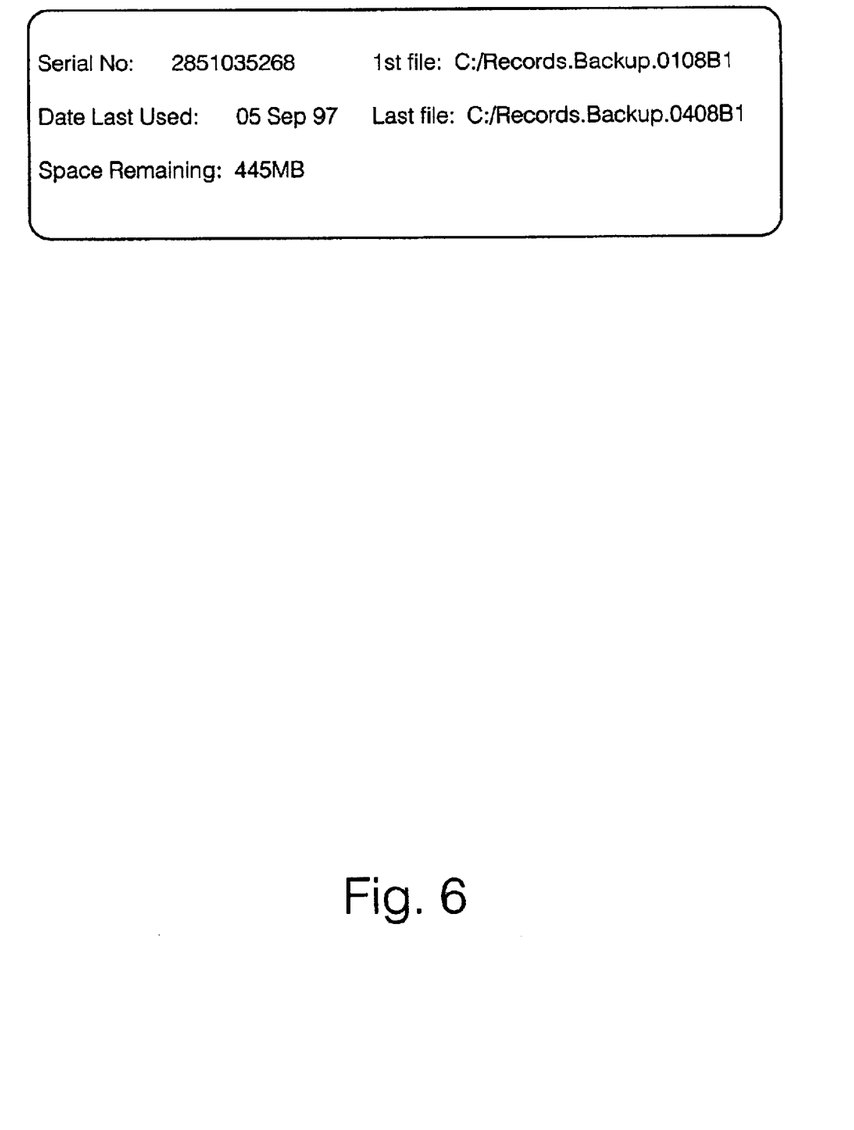
FIG. 6 illustrates schematically an example of a layout of a label printed by the first reader-printer device of FIG. 2.

In a second mode of operation, where it is not required to identify or interrogate information contained on a memory of the tape cartridge, but just to simply print a label to stick on the tape data cartridge, steps 400–406 as described above are repeated. The user places the tape cartridge in the port 202, closes the cover, and the processor interrogates the memory device on the cartridge and stores data received from the memory device in random access memory 306 as described herein above. However, in the second mode of operation the user activates a print key on key pad 206 in step 410 which activates direct printing of a predetermined set of information items received from the memory device 300. An example of a printed label is illustrated in FIG. 6 herein. The predetermined set of information items may be selected from the set; a serial number of the tape; a date the tape was last used; an amount of memory space remaining on the tape; a file name of a first file on the tape; a file name of the last file on the tape, a name of a back up session stored on the tape. This list of predetermined selected information items is exemplary, and not exhaustive, and the exact information items which are printed on the label depend upon the exact information items which are stored on the memory on the cartridge tape, which are specific to the particular media format of the tape cartridge and reader-labeling device, as will be understood by those skilled in the art. Activation of the print key causes automatic printing of the label containing the predetermined information items. The user then releases the cartridge from the port 202, sticks the label on the cartridge and may return the cartridge back to the shelf. An advantage of the second mode of operation is speed of labeling of cartridges. For example, where hundreds or thousands of tape cartridges are stored in a library, the handheld reader-labeling device may be used to efficiently and quickly label a large number of tape cartridges manually with a pre-selected set of information describing the tape cartridge and its contents.

What is claimed is:

1. A hand holdable portable reader device capable of reading data stored in a memory device attached to a cartridge having data storage device therein, said reader device comprising:

a signal receiver means capable of receiving data signals emitted from said memory device;

a memory means capable of storing said data signals received by said receiver means;

a printer device configured to print human readable indicia determined by at least some of said data signals received by the printer device from said receiver means onto a print media; and a processor device operable to control said printer device to print said indicia on said print media, said processor device being configured to select a predetermined selection of information items describing said data storage device from said data received from said memory device, and to control said printer device to print said predetermined set of information items onto a said print media in a predetermined format.

2. The reader device as claimed in claim 1, wherein said printer device is configured for printing a label having a size and shape suitable for direct attachment to a said data storage cartridge.

3. The reader device as claimed in claim 1, wherein said processor device is operable under control of a dedicated operating system stored in a read only memory device.

4. The reader device as claimed in claim 1, further comprising an interface means for interfacing with an external processor.

5. The reader device as claimed in claim 1, wherein said reader device comprises a display means, and said processor device is arranged to operate under control of said an operating system and a keypad data entry means to display a selection of user selectable menu items on said display means.

6. The reader device as claimed in claim 1, having a keypad device comprising a print key wherein said processor is arranged to (a) operate to receive a print signal produced by activation of said print key, and (b) send a print signal to said printer for printing data items input via said receiver means.

7. The reader device as claimed in claim 1, further comprising a port adapted to receive said cartridge and said receiver means is located within said port such that when a said cartridge is inserted into said port, the memory device of said cartridge lies in close physical proximity to said receiver means.

8. The reader device as claimed in claim 1, further comprising a housing for accepting a roll of blank labels.

9. The reader device as claimed in claim 1, further comprising a port adapted to receive said cartridge type data storage device, said port comprising a recess specifically shaped and formed to receive said tape data storage device.

10. The reader device as claimed in claim 1, further comprising a port adapted to locate said cartridge type data storage device, said port comprising a surface against which said data storage device is adapted to be placed in close proximity to said surface, for enabling the receiver means to detect signals transmitted by said data storage device.

11. A hand holdable portable reader device capable of reading data stored in a memory device attached to a cartridge having data storage device therein, said reader device comprising:

a signal receiver means capable of receiving data signals emitted from said memory device;

a memory means capable of storing said data signals received by said receiver means;

a printer device configured to print human readable indicia determined by at least some of said data signals received by the printer device from said receiver means onto a print media; and a processor device operable to control said printer device to print said indicia on said print media, a keypad control means, and a display device, said keypad control means being finger operable for inputting user commands to said processor, for controlling said display device to scan through data items stored in the memory means in response to the memory storing the data signals, the data items describing said data storage structure, said data items retrieved from said memory means.

12. A hand holdable portable reader device capable of reading data stored in a memory device attached to a cartridge having data storage device therein, said reader device comprising:

a signal receiver means capable of receiving data signals emitted from said memory device;

a memory means capable of storing said data signals received by said receiver means;

a printer device configured to print human readable indicia determined by at least some of said data signals received by the printer device from said receiver means onto a print media; and a processor device operable to control said printer device to print said indicia on said print media, a keypad control means configured for operating such that upon a user activating a key of said keypad control means, said printer device operates to print a predetermined selection of data items describing said data storage device, onto said print media.

13. A hand holdable portable reader for reading data stored in a memory structure attached to a housing having a data storage structure and an emitter of data signals including information indicative of at least one of the housing and data stored in the memory structure, said reader comprising:

a hand holdable portable casing including:

(a) a port for receiving the housing;

(b) a signal receiver for receiving the emitted data signals only while the housing is received in the port;

(c) a memory for storing the data signals received by said receiver;

(d) a printer for printing onto a print medium at least some of said information in human readable form;

(f) a processor for selectively causing the memory to couple at least one of the received and stored data signals to the printer; and (g) a battery power supply compartment with connections for powering the signal receiver, memory, printer and processor.

14. The reader of claim 13 wherein said printer is arranged for printing a label having a size and shape for direct attachment to said housing for the data storage structure.

15. The reader of claim 13 wherein said processor is arranged for causing the memory to couple a plurality of the received and stored data signals to the printer, said printer being arranged for printing in human readable form the information in the plural received and stored data signals on a label having a size and shape for direct attachment to said housing for the data storage structure.

16. The reader of claim 15 wherein the casing further comprises a display and a key pad adapted to be tactile operated by a user, said processor being arranged for causing the memory to couple the plurality of the received and stored data signals to the display and for causing the key pad to selectively couple commands resulting from tactile operation of the key pad to the display and printer, the display being arranged to respond to the plurality of the received and stored data signals for displaying in human readable form the information in the plural received and stored data signals coupled to the display.

17. The reader of claim 16 wherein the casing further comprises a dedicated operating system for the processor.

18. The reader of claim 17 wherein the printer comprises a receptacle for receiving a roll of blank labels adapted to have printed thereon by the printer the information in human readable form in the plural received and stored data signals, the blank labels having a size and shape for direct attachment to said housing for the data storage structure.

19. The reader of claim 18 wherein said port has a surface, said housing and casing being arranged so said housing is adapted to be placed in close proximity to, and spaced from, said surface for enabling the receiver to detect the emitted data signals.

20. The reader of claim 13 wherein the casing further comprises a display and a key pad adapted to be tactile operated by a user, said processor being arranged for causing the memory to couple a plurality of the received and stored data signals to the display and for causing the key pad to selectively couple commands resulting from tactile operation of the key pad to the display and printer, the display being arranged to respond to the plurality of the received and stored data signals for displaying in human readable form the information in the plural received and stored data signals coupled to the display.

21. The reader of claim 13 wherein the casing further comprises a dedicated operating system for the processor.

22. The reader of claim 13 wherein the printer comprises a receptacle for receiving a roll of blank labels adapted to have printed thereon by the printer the information in human readable form in a plurality of the received and stored data signals, the blank labels having a size and shape for direct attachment to said housing for the data storage structure.

23. The reader of claim 13 wherein said port has a surface, said housing and casing being arranged so said housing is adapted to be placed in close proximity to, and spaced from, said surface for enabling the receiver to detect the emitted data signals.

24. A hand holdable portable reader for reading data from a memory structure on a data storage structure in a housing, said reader comprising:

a casing having:

(a) a port for accepting the data storage structure;

(b) a reader for reading data from the memory structure, the reader being located in the port and arranged to read the data from the memory structure only while the data storage structure is in the port;

(c) a processor for controlling said reader and for accepting data signals received by said reader;

(d) an operating system for controlling said processor in response to a sequence of command signals adapted to be derived by the operating system;

(e) a display for displaying in user readable format information included in said data received by said reader;

(f) a key pad for receiving user input commands for activation of menu items in said operating system; and (g) a printer adapted to be operated under control of said processor for printing a label adapted to be attached to the housing in response to a user input command supplied to the key pad, said printer being adapted to be activated so said label includes in user readable format information included in at least some of the data read from the memory structure.

* * * * *